(12) United States Patent  (10) Patent No.: US 8,791,855 B2
Weiss  (45) Date of Patent: Jul. 29, 2014

(54) METHOD FOR DETECTING WIND POWER PLANTS USING A RADAR SYSTEM

(75) Inventor: Andreas Weiss, Stegersbach (AT)

(73) Assignee: EADS Deutschland GmbH, Ottobrunn (DE)

(*) Notice: Subject to any disclaimer, the term of this patent is extended or adjusted under 35 U.S.C. 154(b) by 497 days.

(21) Appl. No.: 13/254,526

(22) PCT Filed: Feb. 9, 2010

(86) PCT No.: PCT/DE2010/000143
§ 371 (c)(1),
(2), (4) Date: Oct. 10, 2011

(87) PCT Pub. No.: WO2010/099773
PCT Pub. Date: Sep. 10, 2010

(65) Prior Publication Data
US 2012/0056775 A1 Mar. 8, 2012

(30) Foreign Application Priority Data
Mar. 6, 2009 (DE) .......................... 10 2009 012 064

(51) Int. Cl.
G01S 13/00 (2006.01)
G01S 13/524 (2006.01)
G01S 13/56 (2006.01)

(52) U.S. Cl.
CPC .......... *G01S 13/5244* (2013.01); *G01S 13/524* (2013.01); *G01S 13/56* (2013.01)
USPC ............ 342/159; 342/129; 342/139; 342/162

(58) Field of Classification Search
CPC ....... G01S 13/87; G01S 13/951; G01S 13/42; G01S 13/225; G01S 13/52

USPC .......................... 342/118, 129–131, 137, 159
See application file for complete search history.

(56) References Cited

U.S. PATENT DOCUMENTS

| 6,232,912 | B1* | 5/2001 | Nagel | 342/137 |
| 7,151,481 | B1* | 12/2006 | Strecker et al. | 342/137 |
| 2008/0111731 | A1* | 5/2008 | Hubbard et al. | 342/160 |
| 2008/0136704 | A1* | 6/2008 | Chan et al. | 342/201 |
| 2010/0265120 | A1* | 10/2010 | Drake et al. | 342/36 |
| 2010/0265122 | A1* | 10/2010 | Oswald | 342/136 |
| 2011/0223031 | A1* | 9/2011 | Bond | 416/229 R |
| 2011/0241928 | A1* | 10/2011 | Oswald et al. | 342/90 |

FOREIGN PATENT DOCUMENTS

| DE | 197 50 742 A1 | 5/1999 |
| EP | 0 919 834 B1 | 6/1999 |
| EP | 1 657 565 A1 | 5/2006 |

OTHER PUBLICATIONS

International Search Report with English translation dated Aug. 5, 2010 (six (6) sheets).

(Continued)

*Primary Examiner* — John B Sotomayor
*Assistant Examiner* — Marcus Windrich
(74) *Attorney, Agent, or Firm* — Crowell & Moring LLP

(57) ABSTRACT

A method for detection of wind power installations using a radar installation is provided. The method involves transmitting a number N of predetermined sequences of modulated transmission pulses at a predetermined pulse repetition frequency successively in time and receiving and processing transmission pulses reflected by an object to determine whether the object is a wind power installation.

6 Claims, 1 Drawing Sheet

(56) References Cited

OTHER PUBLICATIONS

Mahr et al., "Non-Equidistant Sampling of Radar Signals", EADS Defence & Security, Defence Electronics, Ulm, Germany, pp. 1-5 (five (5) sheets), Radar Conference (EuRAD) 2010 European, Sep. 30, 2010-Oct. 1, 2010.

Jackson, C.A., "Windfarm Characteristics and their Effect on Radar Systems", BAE Systems Integrated System Technologies, Chelmsford Essex, United Kingdom, (five (5) sheets), International Conference on Radar Systems, Oct. 15-18, 2007.

Gregers-Hansen et al., "EMI Repair in Pulse Doppler Radar", Radar Conference, 2008, Radar 08', IEEE, Piscataway, NJ, USA, May 26, 2008, XP031376076, pp. 1-6 (six (6) sheets).

* cited by examiner

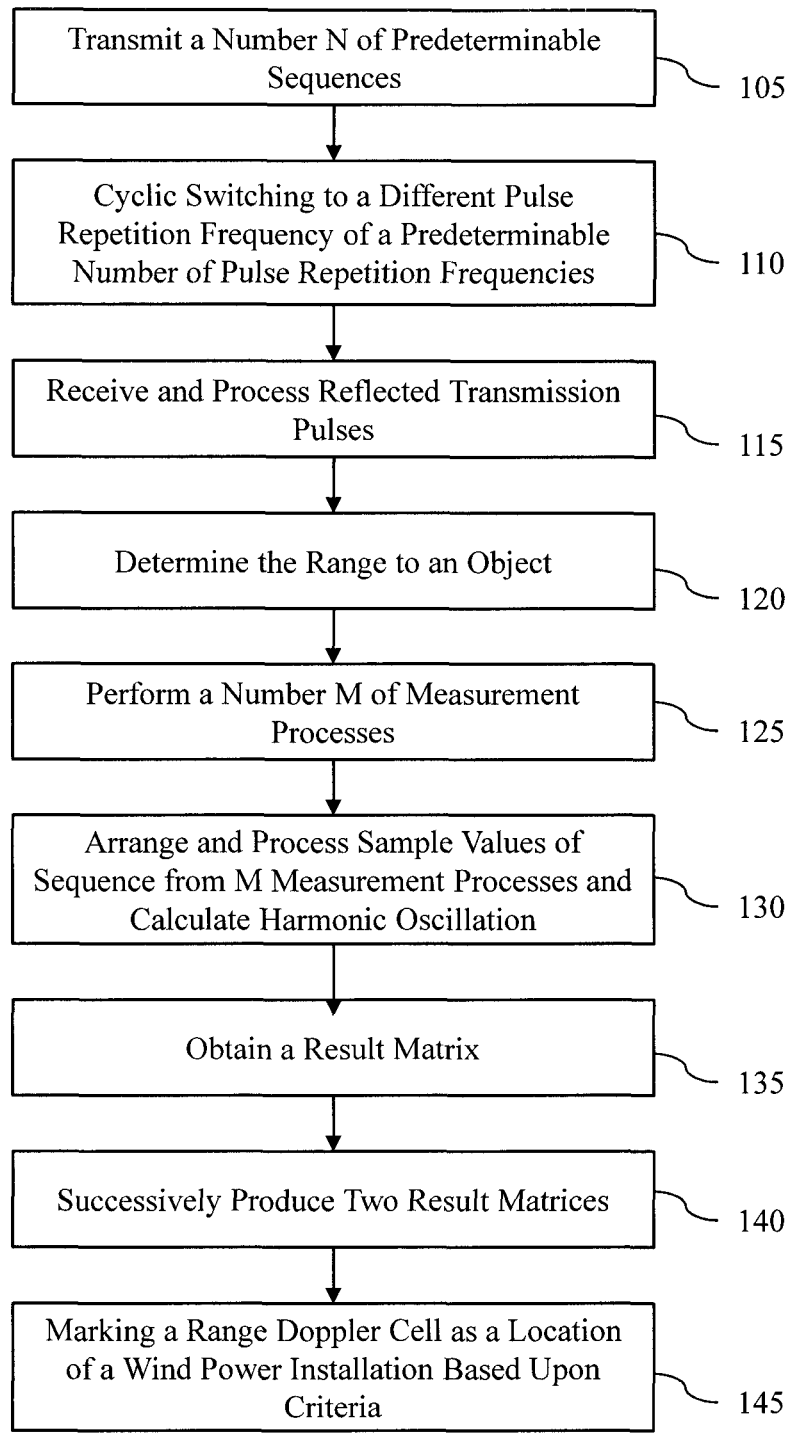

METHOD FOR DETECTING WIND POWER PLANTS USING A RADAR SYSTEM

BACKGROUND AND SUMMARY OF THE INVENTION

The invention relates to a method for detection of wind power installations by means of a radar installation.

A wind power installation (WPI) converts the kinetic energy of the wind to electrical energy. Installations having a horizontal rotation axis through which the wind passes have been implemented, comprising a large number of different types of concept. They generally consist of a cylindrical steel tower with a hub at the end, from which three aerodynamically shaped rotors originate. The height of the tower, the height of the hub and the rotor length vary depending on the power of the turbine and/or the installation location. A summary of typical dimensions is shown below:

| Category | 1.5 | 3 | 5 |
|---|---|---|---|
| Rotor length (m) | 38 | 45 | 62 |
| Hub height (m) | 60-110 | 80-105 | 100-120 |
| Overall height (m) | 98-148 | 125-150 | 162-182 |
| Speed of revolution (rpm) | 17 | 16 | 12 |
| Blade tip speed (m/s) | 68 | 76 | 79 |

The maximum speed of the rotors is measured at the rotor tips, and is calculated using the formula:

$$u = \lambda * v$$

where
u: speed at the rotor tip
$\lambda$: tip speed ratio
v: wind speed

The tip speed ration $\lambda$ is dependent on the type of wind power installation and is 7 to 8 for the installations which are normally used nowadays. Modern wind power installations operate only in the range between a minimum and a maximum wind speed. Furthermore, they are turned to the optimum position with respect to the wind direction by means of actuating motors, and their rotation speeds are regulated, i.e., the speed of revolution is kept approximately constant, and is varied only continuously.

Fundamentally, the following typical circumstances are known for wind power installations:

a) Fixed position—A wind power installation is always located in the same range cell (x, y), i.e., the range and the azimuth angle are constant.

b) Rotation speed regulation of the rotors—Modern wind power installations vary the rotation speed of the rotors only continuously, i.e., there are no sudden changes in the rotor speed, and therefore in the Doppler frequency shift.

c) Constant operating range—Modern wind power installations require a minimum wind speed for operation, and are switched off above a maximum wind speed. This means that the rotor speed, which depends on the wind speed, varies within a defined range.

d) Physical constraints—The minimum distance between individual installations is predetermined both technically and by physical effects. Phenomena such as wind shadow effect and measures to minimize bird strike, noise production, etc., result in a certain minimum distance between individual wind power installations.

Furthermore, wind power installations are distinguished by a large radar cross section (RCS). The radar cross section in S band (2.7-2.9 GHz) and L band (approximately 1.3 GHz) from wind power installation turbines that are currently in use may be up to 300,000 m². Considered individually, the rotor blades may achieve a peak value of up to 30,000 m². In comparison to this, a multi-jet commercial aircraft has an RCS of 5 to 20 m². The RCS values mentioned above for wind power installations refer to peak values, which are dependent on the position of the rotor blades and on the aspect angle of the radar. The RCS of the wind power installation therefore varies continually and suddenly. [C. A. Jackson, Windfarm Characteristics and their Effect on Radar Systems, Proc. International Conference on Radar Systems, Edinburgh, October 2007]

The continuing and sudden change in the RCS of a wind power installation results in the so-called "glint" effect. This means that echo signals appear completely randomly. When there are a plurality of wind power installations in a wind farm, this leads to mutually independent, random glints in this area. These randomly occurring echoes are in the same range as the Doppler shift in which a large number of possible targets for the radar are also located. This "glint" leads to a series of problems:

a) Clutter: Increased number of detections in the area of windfarms, caused by the echoes from the wind power installation rotors.

b) Desensitization: Reduced probability of detection of an airborne target above or in the vicinity of windfarms, both in the azimuth and in the range direction.

c) Trajectory loss: Tracking of a target in the area of windfarms is impossible.

Exemplary embodiments of the present invention provide a method by means of which a wind power installation can be reliably detected, while avoiding the disadvantages from the prior art.

The method according to the invention comprises the following method steps:

a) a number N of predeterminable sequences $B_x$, where $x = 1, \ldots, N$, of K modulated transmission pulses are transmitted, in each case at a predeterminable pulse repetition frequency, successively in time, b) a predeterminable number of pulse repetition frequencies are used, c) after each transmitted sequence, cyclic switching takes place to a different pulse repetition frequency, d) transmission pulses reflected by an object are received and processed by the radar installation such that received pulses which correspond to the transmission pulses are created, wherein a number R of received pulses are received for each transmission pulse, e) the range to the object is determined by means of signal delay-time measurement from the received pulses which belong to the sequences $B_x$ of modulated transmission pulses, and a range Doppler matrix is produced, with R rows and N*K columns, f) a number M of measurement processes are carried out cyclically in an azimuth direction in an azimuth range, wherein N sequences $B_x$, of modulated transmission pulses are transmitted in the respective azimuth direction for each measurement process, and a range Doppler matrix is produced for each measurement process M, g) sample values of Z, where $Z = 2 \ldots N$, sequences $B_N$ of modulated transmission pulses from M measurement processes are arranged in sequence by means of a predeterminable correction term, and are processed, wherein a harmonic oscillation with the least square error with respect to the sample values is calculated by means of a maximum likelihood estimator, h) a result matrix with R rows and N/Z columns is obtained from the range Doppler matrix with R rows and N*K columns by use of the maximum likelihood estimator, wherein the signal strength, phase and Doppler frequency of the object are known for each cell, i) after method steps a)-h), two result matrices E1, E2 are produced successively in time and are compared with one another, wherein a range Doppler cell is marked as a location of a wind power installation if i. the signal strength of a range Doppler cell is above a predeterminable threshold value in both result matrices E1, E2, ii. the Doppler frequency shift in a range Doppler cell is within a normal value range for wind power installations in both result matrices E1, E2, and iii. the difference between the Doppler frequencies in a range Doppler cell in both result matrices E1, E2 is below a predetermined threshold value.

BRIEF DESCRIPTION OF THE DRAWING FIGURE

The sole FIGURE illustrates an exemplary method in accordance with the present invention.

DETAILED DESCRIPTION

The method according to the invention is based on detection using a pulse radar, expediently by a surveillance radar. Such a surveillance radar may, for example, be a radar that rotates completely about its vertical axis and searches for objects in the surrounding area. In this case, a predetermined solid angle range is illuminated once in each revolution. However, a surveillance radar may also be a phased array radar which cyclically illuminates a predetermined solid angle range.

Referring now to the sole FIGURE, the transmitted signal from a pulse radar is a sequence $B_x$ (burst) where $x=1, \ldots, N$, of individual pulses which are modulated onto a radio-frequency carrier oscillation (step 105). By way of example, a burst may comprise 8 pulses. The pulses are emitted via the radar antenna and move away from the radar. When they strike a target object, they are reflected by it in various directions, inter alia back to the radar, while their echo is received again after a certain time. The echo is a copy of the transmitted signal, whose amplitude and frequency differ from the original. The differences, in particular the delay time and the Doppler shift, between the transmitted signal and the received echo make it possible to draw conclusions about the position and the speed of the target object.

In order to restrict the aliasing effect that occurs, i.e., the ambiguity in the Doppler frequency estimate, the time between the transmission of two pulses (PRI=pulse repetition interval) is varied.

In this case, disturbing ambiguities can occur, in a manner known per se, in particular in the determination of the range of the target. This means that there is a range unambiguity zone for each predeterminable pulse repetition frequency (PRF, "pulse repetition frequency"). This zone becomes smaller the higher the PRF is chosen to be. On the other hand, a high PRF (HPRF, "high pulse repetition frequency") is required in order to obtain a speed unambiguity zone which is as great as possible for rapidly moving targets. If there is a range unambiguity zone a long distance away for a predeterminable high speed unambiguity zone, then an HPRF radar installation with at least two switchable PRFs can be used. In this case, the PRF is generally changed during each burst transmission, i.e., switching generally takes place cyclically between the PRFs that are used (step 110). The received echo pulses associated with each PRF are now evaluated, and are compared with those of other PRFs (step 115). On the assumption that a target is being painted by the pulses at a plurality of different PRFs, then both the target speed and its range can be determined in the extended range unambiguity zone (step 120).

Initially, the PRF can be varied only from one pulse to the next. In the case of radars using Doppler frequency measurement, the PRFs for groups of pulses are therefore kept constant, but are varied between different groups. A group with a constant pulse repetition interval, and therefore a constant pulse repetition frequency, is referred to as a pulse sequence or burst. If the pulse repetition frequencies are defined in a fixed ratio with respect to one another, then the expression "staggering of the pulse repetition frequency" is used. These different pulse sequences $B_x$ are now used in a constant sequence. This results in a sampling scheme, which is repeated. One such repetition is referred to as dwell. By way of example, the following text describes a sequence of 3 dwells, with each dwell comprising 3 bursts:

| Burst1 Burst2 Burst3 | Burst1 Burst2 Burst3 | Burst1 Burst2 Burst3 |
|---|---|---|
| Dwell1 | Dwell2 | Dwell3 |

The region observed by the radar is subdivided into a matrix by the sampling scheme and by the range resolution. The range resolution results from the signal delay times of the individual pulses.

A pulse is transmitted, and the delay time $t_L$ to the target and back is calculated as follows:

$$t_L = 2 \cdot \frac{R}{c}$$

where
c: speed of light
R: range of the target.

This means that the time of arrival of the echo signal, in comparison to the transmission time, can be used to calculate the range of the object which produced the echo. This results in a column vector after transmission of a pulse and reception of the arriving echo, with the row classification being based on the calculated range, for example: reception time 20 µs after the transmission of the pulse, the object which produced the echo is at a range of around 2997 meters. The next pulse once again produces a column vector. When these column vectors are arranged in sequence, taking account of the azimuth direction in which the transmitted pulses were emitted, this results in a range azimuth matrix.

As is known, a sequence $S(B_x)$ of sample values is produced [see, for example, Thomas Mahr, Hans-Georg Kölle. Non equidistant sampling of radar signals. In Proceedings of the International Radar Symposium (IRS) 2005 Berlin, Germany, pages 831-835, 2005.] for evaluation of the echo signals of the modulated received pulses associated with a sequence $B_x$ of modulated transmitted pulses, at predetermined sampling times within a predetermined sampling time period. In the case of radar installations that illuminate a predetermined azimuth area, a number M of measurement processes are carried out in an azimuth direction in an azimuth area (step 125). In other words, one measurement process is carried out in the relevant area in each revolution of the radar. The number M of measurement processes therefore relates to the number of revolutions of the radar considered over the relevant azimuth area. N sequences $B_x$ of modulated transmitted pulses are emitted in the respective azimuth direction in each measurement process (revolution). Sequences $S_m(B_x)$ with m=1, ..., M of sample values are produced for the evaluation of the echo signals. These sequences of sample values are also referred to in the following text as a scan.

A radar installation which is known per se is used for the method which will be explained in the following text. In particular, this comprises a (radar) antenna for emission of pulsed transmission signals in a predeterminable (radar) frequency range, and reception of corresponding echo signals. These are mixed down in a manner known per se to a predeterminable intermediate frequency range, and are then demodulated, resulting in pulses from which both the speed and the range of one or more targets can be determined by means of a delay-time measurement. The fundamental evaluation of said transmitted and received signals is known from European Patent document EP 0 919 834 B1, with range Doppler matrices with a predeterminable number of range Doppler cells being produced for detection of targets.

According to the invention, received scans, i.e., sequences $S_m(B_x)$ of sample values of N sequences $B_N$ of modulated transmitted pulses from M measurement processes, are arranged in sequence, and are processed by a maximum likelihood estimator (step 130). In one advantageous embodiment of the invention, this estimator is a sine-fit algorithm, which is described in detail in the article by Mahr et al. mentioned above.

The sine-fit algorithm is a maximum likelihood estimator which calculates the least square error with respect to a harmonic oscillation. When sampling points $f_n = f(x_n)$ of the complex sinusoidal oscillation are available with the parameters amplitude A, phase α and frequency f, the sought parameters are determined by minimizing the parameter Q:

$$Q := \sum_{n=1}^{N} (g(x_n) - f_n) * conj(g(x_n) - f_n)$$

where
g: a model function with the parameters $p_1, \ldots, p_n$
$f_n$: sample values (samples).

Assuming a sinusoidal complex oscillation, the model function g becomes:

$$g := A * e^{(i \cdot 2 \cdot \pi \cdot f x + \alpha)}$$

where
A: amplitude
F: frequency
X: sampling time
α: phase.

As described in the Mahr et al. article mentioned above, this results in a linear equation system for the amplitude A and the phase α at a constant frequency f:

$$\alpha = \arctan \frac{\gamma}{\beta}$$

$$A = \frac{\beta^2 + \gamma^2}{N\beta} \cos\alpha$$

$$Q - Q_0 = A * [A * N - 2 * (\beta\gamma\sin\alpha)]$$

where $$\beta = \sum_{n}^{N} \Re(f_n)\cos(2*\pi*f*x_n) + \Im(f_n)\sin(2*\pi*f*x_n)$$

$$\gamma = \sum_{n}^{N} \Im(f_n)\cos(2*\pi*f*x_n) + \Re(f_n)\sin(2*\pi*f*x_n)$$

$$Q_0 = \sum_{n}^{N} f_n * conj(f_n)$$

The sinusoidal oscillation on which the sampling points x are based can be reconstructed with the aid of this linear equation system, by insertion of different values for the frequency f, and then finding the minimum error.

In the case of stationary short-range radars, for example surveillance radars, there is a certain time t (dependent on the radar type generally 2 to 5 seconds) between the illumination of the same range cell, i.e., between the individual revolutions, and therefore the individual measurement processes. The wind power installation is always located in the same cell relative to the radar, and produces approximately the same Doppler frequency shift because of the rotation speed regulation of the rotors.

During the processing according to the invention, the pulses that illuminate one range cell from a plurality of successive scans in time are now arranged in sequence, and are processed. This results in a multiplication of the samples that can be used for calculation. The sample values in each scan are expediently recorded at the same azimuth position. When the samples from different scans are arranged in sequence, this leads to a sudden phase change, since the time t between the revolutions does not correspond to an integer multiple of the period duration of the search frequencies.

In other words, when the sequences $S_m(B_x)$ of sample values from M measurement processes are arranged in sequence, this leads to a sudden phase change between adjacent sequences $S_m(B_x)$ of sample values when the respectively adjacent sequences originate from different measurement processes. A phase correction is advantageously carried out, in which the individual sample values of a scan n+1 are shifted by a correction term $t_{shift}$ with respect to a scan n at a previous time. This correction term $t_{shift}$ is calculated as follows:

$$t_{shift} = \frac{\varphi_1 - \varphi_2}{f_z}$$

$\phi_1$ ... phase pulse scan n
$\phi_2$ ... phase pulse scan n+1
$f_z$ ... search frequency The sample times of the scan n+1 are now shifted through $t_{shift}$, resulting in them being in phase with the scan n for the search frequency $f_s$. The search frequencies used in which the echo of a wind power installation may be located vary within a fixed range. This is a direct consequence of the feature of the constant operating range of wind power installations, i.e., either the wind rotor produces a Doppler frequency shift in the search frequencies, or it does not move, and therefore does not produce any disturbances. The search frequencies can be scaled precisely as required, i.e., for example, if a range from 600 to 1200 Hz is being searched, the search can be carried out both in 10 Hz steps and in 0.1 Hz steps.

In a first variant of the invention, when the sample values of the successive measurement processes in time are arranged in sequence, the dwell for one scan is attached to the next scan, etc. In other words, the individual bursts from each measurement process (revolution) are combined with the corresponding scans as the dwell, and are arranged in sequence. The measurements, i.e., the scans, from the individual revolutions are therefore arranged in sequence. This variant will be explained in the following text using the example of two revolutions (measurement processes), each comprising 3 bursts, and therefore 2 scans.

In a first revolution, the sample values Scan 1 occur for the Burst 1, i.e., $S_1(B_1)$, the sample values Scan 1 occur for the Burst 2, i.e., $S_1(B_2)$, and the sample values Scan 1 occur for the Burst 3, i.e., $S_1(B_3)$. In a second revolution, which follows the first revolution in time, the sample values Scan 2 occur for the Burst 1, i.e., $S_2(B_1)$, the sample values Scan 2 occur for the Burst 2, i.e., $S_2(B_3)$, and the sample values Scan 2 occur for the Burst 3, i.e., $S_2(B_3)$.

The sample values determined from the two revolutions are arranged in sequence, using a phase correction term K which shifts the sample values in the scans 2, as explained above, corresponding to:

$S_1B_1$ $S_1B_2$ $S_1B_3$ K $S_2B_1$ $S_2B_2$ $S_2B_3$

In this case, the section $S_1B_1$ $S_1B_2$ $S_1B_3$ or $S_2B_1$ $S_2B_2$ $S_2B_3$ are each referred to as a dwell. One advantage of this staggering of the scans is that only one sudden phase change need be corrected between the dwells.

In a second variant of the invention, the corresponding bursts from successive measurement processes in time are arranged in sequence. This variant will be explained in the following text with reference to an example for two revolutions (measurement processes), each comprising 3 bursts and therefore 2 scans.

In the same way as in the example from the first variant, in a first revolution, sample values Scan 1 occur for the Burst 1, i.e., $S_1(B_1)$, sample values Scan 1 occur for the Burst 2, i.e., $S_1(B_2)$ and sample values Scan 1 occur for the Burst 3, i.e., $S_1(B_3)$. In a second revolution, which follows the first revolution in time, the sample values Scan 2 occur for the Burst 1, i.e., $S_2(B_1)$, the sample values Scan 2 occur for the Burst 2, i.e., $S_2(B_2)$, and the sample values Scan 2 occur for the Burst 3, i.e., $S_2(B_3)$.

The sample values determined for a burst from both revolutions are arranged in sequence, using a phase correction term K which shifts the sample values from different revolutions, as explained above, corresponding, to:

$S_1B_1$ K $S_2B_1$ K $S_1B_2$ K $S_2B_2$ K $S_1B3_1$ K $S_2B_3$

In this form of arrangement in sequence, a phase correction K is carried out after each burst. The advantages are that the result is more "geographically" accurate, and that the region can be resolved more accurately from the intermediate results, without additional computation effort. The more accurate resolution results from the fact that the intermediate results of bursts of the same type (for example: Burst1 Scan1 and Burst1 Scan2) can be represented as a range cell.

According to the invention, a harmonic oscillation with the least square error with respect to the sample values is calculated using the maximum likelihood estimator, expediently the sine-fit algorithm, from the respective arrangement in sequence. The result is a matrix in which the signal strength, the phase and the frequency of the target are known for each cell (step 135).

According to the invention, two result matrices E1, E2 that are produced successively in time are produced and compared with one another (step 140), with a cell being marked as a location of a wind power installation, when the following features are satisfied (step 145):

1) Signal strength—The signal strength of the cell must be above a certain threshold value in each of the two result matrices E1, E2. If the signal strength of the cell is above the threshold value in only one of the two result matrices E1, E2, this may be a wind power installation, since the wind power installation is at a fixed position and must appear in both result matrices E1, E2. If only one result matrix E1, E2 exceeds the threshold value, this is a moving target in most cases.

2) Restriction of the possible Doppler frequency shift—This means that, if the wind speed is known, the rough range of possible rotor speeds is therefore also known, from which the Doppler frequency shift is derived. If the value of the range cell is now outside this range, this cannot be a wind power installation.

3) Discrepancy in the Doppler frequencies found between the result matrices E1, E2. Because of the rotation speed regulation, the frequency found for the range cell must be in the same range in both result matrices E1, E2. If the frequencies differ excessively, the echo of the received transmitted signal cannot originate from a wind power installation.

If all the criteria are satisfied, the corresponding cell is marked as the location of a wind power installation.

The combination according to the invention of the samples from a plurality of scans solves the fundamental problem of the "glint" effect of wind power installations in the area of operation of the surveillance radar. The multiplication of the amount of data on which the calculation is based makes it possible for the first time ever to carry out an approximately constant evaluation over time, followed by a comparison process, which allows detection.

A further advantage is the active tracking of the locations of wind power installations instead of just having to suppress the effects that occur, as was previously normal practice. The deliberate use of the features makes it possible to easily distinguish between wind power installations and other targets. Furthermore, no other information sources are required about the location of the wind power installations in the area of operation of the radar, as in the past, in order to mark the corresponding areas.

The method can be very easily matched to the respective radar type (number of bursts, revolution time, sampling times, etc.).

The parameters frequency and amplitude are determined directly for each range cell, and represent important input data for possible further evaluations and processing.

The frequency range can be scaled precisely as required, i.e., the search area can be matched to the prevailing conditions. Frequency ranges which play no role are already ignored by the processing.

The deliberate tracking and marking of the areas affected by wind power stations make it possible to simply distinguish between moving targets and wind power installations. This in turn leads to a major improvement in the tracking of a target in the area of wind power installations.

The invention claimed is:

1. A method for detection of wind power installations using a radar installation, the method comprising:
   a) transmitting a number N of predetermined sequences $B_x$ of K modulated transmission pulses at a predetermined pulse repetition frequency successively in time, where x=1, . . . , N, wherein after each transmitted sequence a cyclic switching is performed to a different pulse repetition frequency of a predetermined number of pulse repetition frequencies;
   b) receiving and processing, by the radar installation, transmission pulses reflected by an object, wherein the processing creates received pulses corresponding to the transmitted pulses, wherein a number R of received pulses are received for each transmission pulse;
   c) determining a range to the object using a signal delay-time measurement from the received pulses belonging to the sequences $B_x$ of modulated transmission pulses, and producing a range Doppler matrix with R rows and N*K columns;

d) cyclically performing a number M of measurement processes in an azimuth direction in an azimuth range, wherein N sequences $B_x$ of modulated transmission pulses are transmitted in the respective azimuth direction for each measurement process, and a range Doppler matrix is produced for each measurement process M;

e) arranging, in sequence using a predetermined correction term, sample values of Z sequences $B_N$ of modulated transmission pulses from M measurement processes, where Z=2 . . . N, and processing the arranged sequences, wherein a harmonic oscillation with a least square error with respect to the sample values is calculated using a maximum likelihood estimator;

f) obtaining a result matrix with R rows and N/Z columns from the range Doppler matrix with R rows and N*K columns using the maximum likelihood estimator, wherein the signal strength, phase and Doppler frequency of the object are known for each cell;

g) successively producing two result matrices E1, E2 in time after method steps a)-f), and comparing the two result matrices with one another, wherein a range Doppler cell is marked as a location of a wind power installation if
  i. the signal strength of a range Doppler cell is above a predeterminable threshold value in both result matrices E1, E2,
  ii. the Doppler frequency shift in a range Doppler cell is within a normal value range for wind power installations in both result matrices E1, E2, and
  iii. the difference between the Doppler frequencies in a range Doppler cell in both result matrices E1, E2 is below a predetermined threshold value.

2. The method as claimed in claim 1, wherein when the sequences $S_m(B_x)$ of sample values from M measurement processes are arranged in sequence, a phase correction of adjacent sequences $S_m(B_x)$ of sample values is taken into account, if the adjacent sequences $S_m(B_x)$ originate from sample values from different measurement processes, where m=1 . . . M.

3. The method as claimed in claim 2, wherein the arrangement of the sequences $S_m(B_x)$ of sample values from M measurement processes in sequence is carried out as follows:

$S_1(B_1), S_1(B_2), \ldots, S_1(B_N), K, S_2(B_1), S_1(B_2), \ldots, S_2(B_N), \ldots, K, S_M(B_1), S_M(B_2) \ldots, S_M(B_N)$, where K is a phase correction term.

4. The method as claimed in claim 2, wherein the arrangement of the sequences $S_m(B_x.)$ of sample values from M measurement processes in sequence is carried out as follows:

$S_1(B_1), K, S_2(B_1), K, \ldots, K, S_M(B_1), K, S_1(B_2), K, S_2(B_2), K, \ldots, K, S_M(B_2) K, \ldots, K, S_1(B_N), K, S_2(B_N), K, \ldots, K, S_M(B_N)$, where K is a phase correction term.

5. The method as claimed in claim 3, wherein the phase correction term K is used to shift the sampling times of a sequence of successive items such that adjacent sequences $S_m(B_x)$ have the same phase.

6. The method as claimed in claim 4, wherein the phase correction term K is used to shift the sampling times of a sequence of successive items such that adjacent sequences $S_m(B_x)$ have the same phase.

* * * * *